US011587301B2

(12) United States Patent
Deng et al.

(10) Patent No.: US 11,587,301 B2
(45) Date of Patent: Feb. 21, 2023

(54) IMAGE PROCESSING DEVICE, IMAGE PROCESSING METHOD, AND IMAGE PROCESSING SYSTEM

(71) Applicant: HITACHI SOLUTIONS, LTD., Tokyo (JP)

(72) Inventors: Ziwei Deng, Tokyo (JP); Quan Kong, Tokyo (JP); Naoto Akira, Tokyo (JP); Tomokazu Murakami, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 167 days.

(21) Appl. No.: 17/071,452

(22) Filed: Oct. 15, 2020

(65) Prior Publication Data
US 2021/0248408 A1 Aug. 12, 2021

(30) Foreign Application Priority Data
Feb. 6, 2020 (JP) .............................. JP2020-018599

(51) Int. Cl.
*G06V 10/00* (2022.01)
*G06V 10/26* (2022.01)
(Continued)

(52) U.S. Cl.
CPC ........... *G06V 10/26* (2022.01); *G06K 9/6232* (2013.01); *G06K 9/6256* (2013.01);
(Continued)

(58) Field of Classification Search
CPC ...... G06V 10/26; G06V 10/40; G06V 30/274; G06V 10/454; G06V 10/82; G06K 9/6232;
(Continued)

(56) References Cited

U.S. PATENT DOCUMENTS

| 2006/0122480 A1* | 6/2006 | Luo ..................... G06T 7/149 600/407 |
| 2017/0224302 A1* | 8/2017 | Von Berg ................ A61B 6/466 |
| 2021/0150226 A1* | 5/2021 | Rong ................... G06K 9/6256 |

OTHER PUBLICATIONS

Follmann et al , learning to see the Invisible: End-to-End Trainable Amodal Instance Segmentation, 2019 IEEE Winter Conference on Applications of Computer Vision (WACV), Waikoloa, Hi, USA, pp. 1328-1336 (Year: 2019).*

(Continued)

*Primary Examiner* — Nancy Bitar
*Assistant Examiner* — Xiao Liu
(74) *Attorney, Agent, or Firm* — Volpe Koenig

(57) ABSTRACT

Provided are: an amodal segmentation unit that generates a set of first amodal masks indicating a probability that a particular pixel belongs to a relevant object for each of objects, with respect to an input image in which a plurality of the objects partially overlap; an overlap segmentation unit that generates an overlap mask corresponding only to an overlap region where the plurality of objects overlap in the input image based on an aggregate mask obtained by combining the set of first amodal masks generated for each of the objects and a feature map generated based on the input image; and an amodal mask correction unit that generates and outputs a second amodal mask, which includes an annotation label indicating a category of each of the objects corresponding to a relevant pixel, for each of pixels in the input image using the overlap mask and the aggregate mask.

9 Claims, 11 Drawing Sheets

(51) Int. Cl.
  *G06T 7/11* (2017.01)
  *G06K 9/62* (2022.01)
  *G06T 7/194* (2017.01)
  *G06T 7/13* (2017.01)
  *G06V 10/40* (2022.01)
  *G06V 30/262* (2022.01)

(52) U.S. Cl.
  CPC .............. *G06K 9/6267* (2013.01); *G06T 7/11* (2017.01); *G06T 7/13* (2017.01); *G06T 7/194* (2017.01); *G06V 10/40* (2022.01); *G06V 30/274* (2022.01); *G06T 2207/10116* (2013.01); *G06T 2207/20076* (2013.01); *G06T 2207/20081* (2013.01); *G06T 2207/20084* (2013.01)

(58) Field of Classification Search
  CPC .. G06K 9/6256; G06K 9/6267; G06K 9/6271; G06T 7/11; G06T 7/13; G06T 7/194; G06T 2207/10116; G06T 2207/20076; G06T 2207/20081; G06T 2207/20084
  See application file for complete search history.

(56) References Cited

OTHER PUBLICATIONS

Zhu et al, Semantic Amodal Segmentation, 2017 IEEE Conference on Computer Vision and Pattern Recognition (CVPR), pp. 3001-3009 (Year: 2017).*
Pinheiro et al, Learning to refine object segments, 2016 ECCV (Year: 2016).*
Zhu, Yan et al. "Semantic Amodal Segmentation." CVPR (2015).

* cited by examiner

FIG. 9
900

| OVERLAP STATE | ANNOTATION RULE | CHANNEL ORDER | EXAMPLE |
|---|---|---|---|
| NON-OVERLAP | ASSIGN ANNOTATION LABEL TO ENTIRE BOUNDARY LINE OF SHAPE | OPTIONAL |  |
| TRANSPARENT OVERLAP | PREDICT BOUNDARY LINE OF SHAPE BASED ON SHAPE AND COLOR OF CATEGORY OF OBJECT AND ASSIGN ANNOTATION LABEL | SEQUENTIALLY STACK OBJECTS WITH HIGHER DENSITY FROM TOP TO BOTTOM<br><br>METAL (BLUE/BLACK)<br>↓<br>INORGANIC/LIGHT METAL (GREEN)<br>↓<br>ORGANIC (YELLOW) |  |
| SEMI-TRANSPARENT OVERLAP | | | 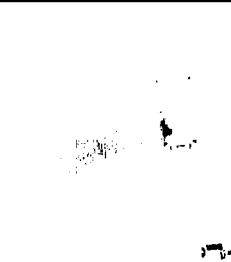 |

905 910 915 920

IMAGE PROCESSING DEVICE, IMAGE PROCESSING METHOD, AND IMAGE PROCESSING SYSTEM

CROSS-REFERENCE TO RELATED APPLICATIONS

The present application claims priority to Japanese Patent Application No. 2020-018599, filed Feb. 6, 2020. The contents of this application are incorporated herein by reference in their entirety.

BACKGROUND OF THE INVENTION

1. Field of the Invention

The present invention relates to an image processing device, an image processing method, and an image processing system.

2. Description of the Related Art

In recent years, many sensors have been arranged in society with the progress of IT and an extremely large amount of data has been accumulated. Under such circumstances, various measures for utilizing collected image data have been studied. In particular, as the number of video contents such as photographs, videos, and images, has been increasing, there is an increasing need for freely specifying an object in such a video and segmenting a specific image from its background or other objects even for the image in which a plurality of objects overlap.

As one of means for image segmentation, neural networks for image segmentation using deep learning are known. In a case of an image on which a plurality of objects appear, it is possible to determine categories and regions of the respective objects with high accuracy by using the neural networks for image segmentation, and these neural networks for image segmentation are applied in various fields.

However, conventional neural networks for image segmentation mainly assume that one object or background appears in each pixel, and it is difficult to perform determination on a complete shape of an object (so-called amodal segmentation) including a region hidden by another object, for example, in a case of a complicated image captured by an X-ray device where two or more semi-transparent objects overlap in one pixel.

An example of the amodal segmentation is a study conducted by Zhu, Yan et al (Zhu, Yan et al. "Semantic Amodal Segmentation." CVPR (2015)).

Zhu, Yan et al. "Semantic Amodal Segmentation." CVPR (2015) describes that "we propose a detailed image annotation that captures information beyond the visible pixels and requires complex reasoning about full scene structure. Specifically, we create an amodal segmentation of each image: the full extent of each region is marked, not just the visible pixels. Annotators outline and name all salient regions in the image and specify a partial depth order. The result is a rich scene structure, including visible and occluded portions of each region, figure-ground edge information, semantic labels, and object overlap."

SUMMARY OF THE INVENTION

In Zhu, Yan et al. "Semantic Amodal Segmentation." CVPR (2015), a neural network trained with an annotation label created by the human annotator as training data predicts the entire outline of the object.

However, Zhu, Yan et al. "Semantic Amodal Segmentation." CVPR (2015) relates to a system optimized for an image on which only a front object appears, the image with the overlap of two objects, and does not assume an application to an image on which three or more objects, for example, are duplicated (that is, "heavy occlusion"), such as an X-ray image, or an image in which a material of an object is represented by a color or the degree of transparency. Therefore, even if the amodal segmentation means described in Zhu, Yan et al. "Semantic Amodal Segmentation." CVPR (2015) is applied to such an image, the accuracy of discriminating a category and a region of each object is inevitably limited.

Therefore, an object of the invention is to provide an amodal segmentation means for generating an amodal mask, which includes a multi-channel annotation label indicating a category and a complete shape of a relevant object with high accuracy, for each of objects even in the case of a complicated image in which the multiple objects overlap.

In order to solve the above problems, a representative aspect of an image processing device of the invention includes: an amodal segmentation unit that generates a set of first amodal masks indicating a probability that a particular pixel belongs to a relevant object for each of objects, with respect to an input image in which a plurality of the objects at least partially overlap; an overlap segmentation unit that processes an aggregate mask obtained by combining the set of first amodal masks generated for each of the objects and a feature map generated based on the input image using an encoder-decoder model to generate an overlap mask corresponding only to an overlap region where the plurality of objects overlap in the input image; and an amodal mask correction unit that generates a second amodal mask including an annotation label indicating which object a relevant pixel belongs to, for each of pixels using the overlap mask and the aggregate mask.

Advantageous Effects of Invention

According to the invention, it is possible to provide the amodal segmentation means for generating the amodal mask, which includes the multi-channel annotation label indicating the category and the complete shape of the relevant object with high accuracy, for each of the objects even in the case of the complicated image in which the multiple objects overlap.

BRIEF DESCRIPTION OF THE DRAWINGS

FIG. 9 is a view illustrating an example of an annotation rule which is reference information for a user when generating the multi-channel ground truth according to the embodiment of the invention;

DESCRIPTION OF THE PREFERRED EMBODIMENTS

Figure 1:
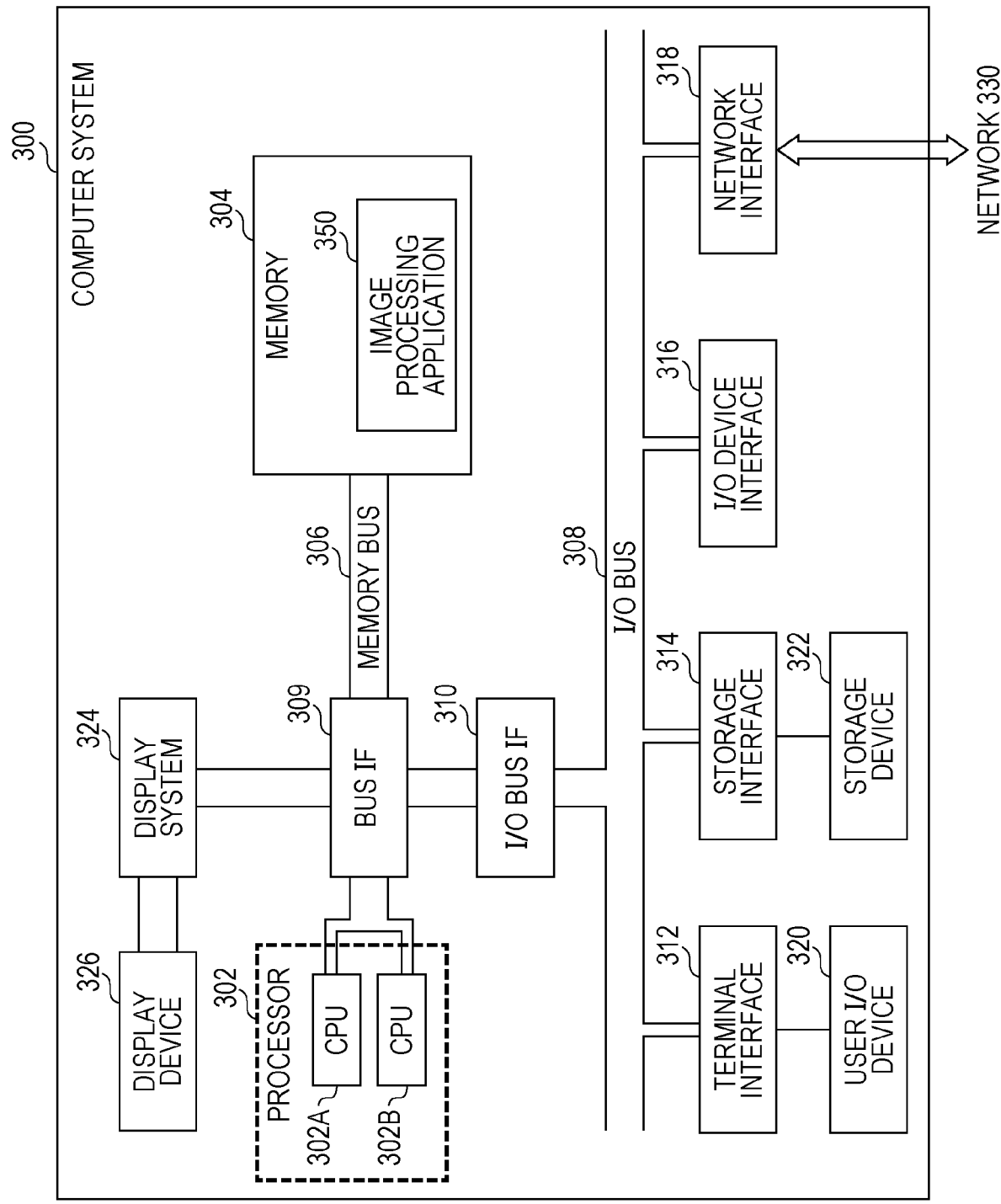
FIG. 1 is a diagram illustrating a computer system for carrying out an embodiment of the invention.

Hereinafter, a conventional example and embodiments of the invention will be described with reference to drawings. The invention is not limited to the embodiments. In the description of the drawings, the same parts are designated by the same reference signs.

(Hardware Configuration)

First, a computer system 300 for carrying out an embodiment of the present disclosure will be described with reference to FIG. 1. Features and devices of the various embodiments disclosed in the present specification may be applied to any suitable computing system. The main components of computer system 300 include one or more processors 302, a memory 304, a terminal interface 312, a storage interface 314, an input/output (I/O) device interface 316, and a network interface 318. These components may be connected to each other via a memory bus 306, an I/O bus 308, a bus interface unit 309, and an I/O bus interface unit 310.

The computer system 300 may include one or a plurality of general-purpose programmable central processing units (CPUs) 302A and 302B which are collectively referred to as a processor 302. The computer system 300 may comprise a plurality of processors in one embodiment, and the computer system 300 may be a single CPU system in another embodiment. Each of the processors 302 executes an instruction stored in the memory 304 and may include an on-board cache.

In one embodiment, the memory 304 may include a random-access semiconductor memory, a storage devices, or a storage media (that is either volatile or non-volatile) for storing data and a program. The memory 304 may store all or some of programs, modules, and data structures that implement the functions described in the present specification. For example, the memory 304 may store an image processing application 350. In one embodiment, the image processing application 350 may include instructions or descriptions that execute the functions to be described below on the processor 302.

In one embodiment, the image processing application 350 may be implemented on hardware via a semiconductor device, a chip, a logic gate, a circuit, a circuit card, and/or other physical hardware devices, instead of the processor-based system or in addition to the processor-based system. In one embodiment, the image processing application 350 may include data other than the instructions or descriptions. In one embodiment, a camera, a sensor, or other data input devices (not illustrated) may be provided so as to communicate directly with the bus interface unit 309 and the processor 302, or another hardware of the computer system 300.

The computer system 300 may include the bus interface unit 309 that performs communication among the processor 302, the memory 304, a display system 324, and the I/O bus interface unit 310. The I/O bus interface unit 310 may be coupled to the I/O bus 308 configured to transfer data among various I/O units. The I/O bus interface unit 310 may communicate with the plurality of I/O interface units 312, 314, 316, and 318, also known as I/O processors (IOPs) or I/O adapters (IOAs), via the I/O bus 308.

The display system 324 may include a display controller, a display memory, or the both. The display controller can provide a video, audio, or the both data to the display device 326. The computer system 300 may also include devices such as one or a plurality of sensors configured to collect data and provide the data to the processor 302.

For example, the computer system 300 may include a biometric sensor that collects heart rate data, stress level data, and the like, an environment sensor that collects humidity data, temperature data, pressure data, and the like, and a motion sensor that collects acceleration data, motion data, and the like. Other types of sensors can also be used. The display system 324 may be connected to the display device 326 such as a stand-alone display screen, a television, a tablet, and a portable device.

The I/O interface unit has a function of communicating with various storages or I/O devices. For example, a user I/O device 320, such as a user output device such as a video display device and a speaker TV and a user input device such as a keyboard, a mouse, a keypad, a touch pad, a trackball, a button, a write pen, and another pointing device, can be attached to the terminal interface unit 312. A user may operate the user input device using the user interface to input input data and an instruction to the user I/O device 320 and the computer system 300, and receive output data from the computer system 300. For example, the user interface may be displayed on a display device via the user I/O device 320, played by a speaker, or printed via a printer.

To the storage interface 314, one or a plurality of disk drives and a direct-access storage device 322 (usually a magnetic disk drive storage device, but may be an array of disk drives configured to appear as a single disk drive or other storage devices) can be attached. In one embodiment, the storage device 322 may be mounted as any secondary storage device. A content of the memory 304 may be stored in the storage device 322 and read from the storage device 322 as needed. An I/O device interface 316 may provide an interface to other I/O devices such as a printer and a fax machine. The network interface 318 may provide a communication path such that the computer system 300 and other devices can communicate with each other. This communication path may be a network 330, for example.

In one embodiment, the computer system 300 may be a device that receives a request from another computer system (client) that does not have a direct user interface, such as a multi-user mainframe computer system, a single-user system, and a server computer. In another embodiment, the computer system 300 may be a desktop computer, a portable computer, a laptop, a tablet computer, a pocket computer, a phone, a smartphone, or any other suitable electronic device.

Next, an image processing system according to an embodiment of the invention will be described with reference to FIG. 2.

Figure 2:
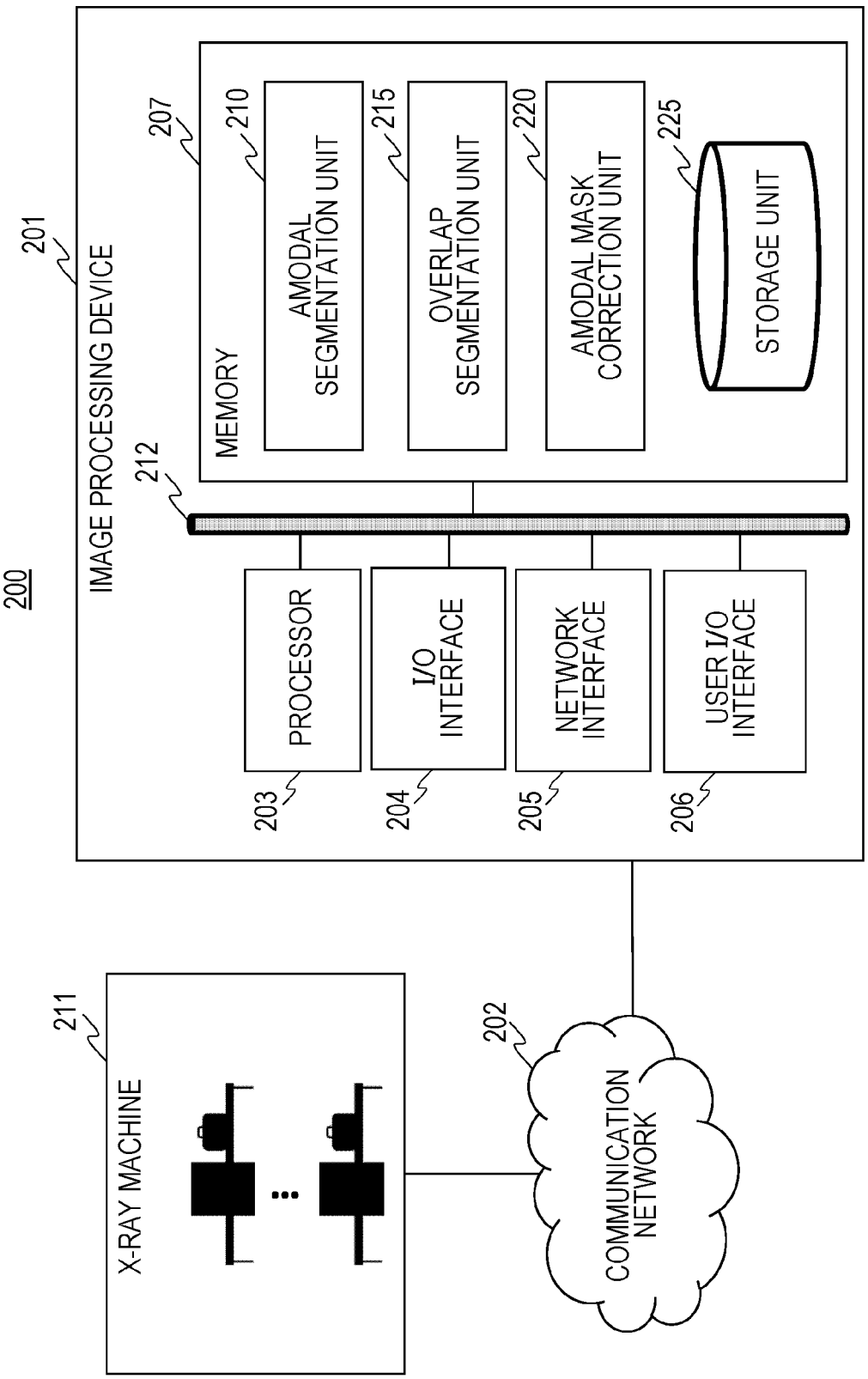
FIG. 2 is a diagram illustrating an example of a configuration of an image processing system according to an embodiment of the invention.

FIG. 2 is a diagram illustrating an example of a configuration of an image processing system 200 according to the embodiment of the invention. As illustrated in FIG. 2, the image processing system 200 according to the invention mainly includes an X-ray device 211, a communication network 202, and an image processing device 201. The X-ray device 211 and the image processing device 201 are connected via the communication network 202.

The communication network 202 may include, for example, a local area network (LAN), a wide area network (WAN), a satellite network, a cable network, a Wi-Fi network, or any combination thereof. The connection between the X-ray device 211 and the image processing device 201 may be wired or wireless.

The X-ray device 211 is a device that captures an X-ray image. The X-ray device 211 includes, for example, an X-ray generator that emits an X-ray and an X-ray detector that detects and analyzes the reflected X-ray. A type of the X-ray device 211 according to the invention is not particularly limited, and may be an X-ray device for baggage, a backscatter X-ray inspection device, or a medical X-ray device. The X-ray device 211 is configured to capture an X-ray image of a predetermined subject and transmit the captured X-ray image to the image processing device 201 via the communication network 202.

Although FIG. 2 illustrates an example of a configuration in the case of including the X-ray device 211 as a configuration for processing an X-ray image, the invention is not limited thereto. The X-ray device 211 may be, for example, any camera, a sensor, or another device that provides an input image to be subjected to image processing.

The image processing device 201 is a computing device configured to execute an image processing means according to the invention. The image processing device 201 may be, for example, a desktop computer, a server computer, a laptop computer, a tablet computer, a workstation, a mobile terminal, or any other type of computing device, and is not particularly limited in the invention.

As illustrated in FIG. 2, the image processing device 201 includes: a processor 203 configured to execute an instruction stored in a memory 207; an I/interface 204 configured to control communication between internal and external devices of the image processing device 201; a network interface 205 configured to control communication via the communication network 202; a user I/O interface 206 configured to receive input from the user; the memory 207 that stores functional units configured to execute functions of the image processing means according to the embodiment of the invention; and a bus 212 configured to control bidirectional communication among these components.

As illustrated in FIG. 2, for example, the memory 207 includes: an amodal segmentation unit 210 that generates a set of first amodal masks indicating a probability that a particular pixel belongs to a relevant object for each of objects, with respect to an input image in which a plurality of the objects at least partially overlap; an overlap segmentation unit 215 that processes an aggregate mask obtained by combining the set of first amodal masks generated for each of the objects and a feature map generated based on the input image using an encoder-decoder model to generate an overlap mask corresponding only to an overlap region where the plurality of objects overlap in the input image; an amodal mask correction unit 220 that generates a second amodal mask including an annotation label indicating which object a relevant pixel belongs to, for each of pixels using the overlap mask and the aggregate mask; and a storage unit 225 that stores various types of information.

Note that the respective functional units included in the image processing device 201 may be software modules that constitute the image processing application 350 in the computer system 300 illustrated in FIG. 1, or may be dedicated hardware devices that are independent. Further, the above functional units may be implemented in the same computing environment or distributed computing environments. For example, it is also possible to employ a configuration in which the amodal segmentation unit 210 that generates the set of first amodal masks is mounted on the X-ray device 211 or a remote server and the other functional units are mounted on the image processing device 201.

With the configuration described above, the amodal mask, which includes a multi-channel annotation label indicating a category and a complete shape of a relevant object with high accuracy, can be generated for each of objects by processing an input image received from an external device, such as the X-ray device 211 via the communication network 202, by the image processing device 201.

Next, a flow of an amodal mask generation process executed by the image processing device according to the embodiment of the invention will be described with reference to FIG. 3.

Figure 3:
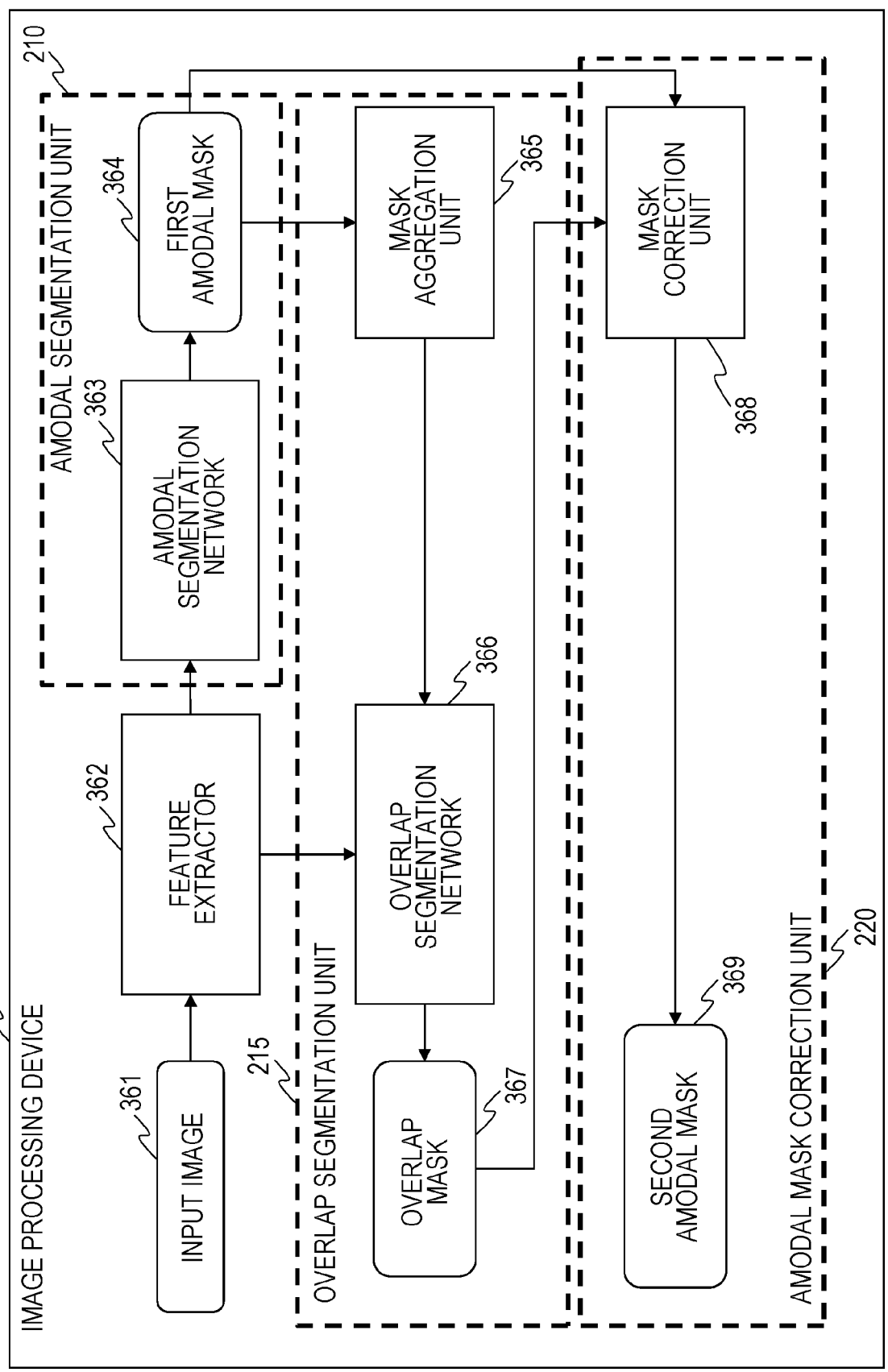
FIG. 3 is a diagram illustrating a flow of an amodal mask generation process executed by the image processing device according to the embodiment of the invention.

FIG. 3 is a diagram illustrating the flow of the amodal mask generation process 360 executed by the image processing device 201 according to the embodiment of the invention.

As described above, one annotation label is attached to one pixel in the conventional dataset annotation. This annotation label is metadata that specifies at least a category of a relevant pixel (a type of a predetermined object such as a human, a car, and a building). Since each pixel corresponds to one annotation label, an annotation file that stores an annotation label assigned to each pixel of a certain image is single-channel (single-layer) information.

If such a conventional single-channel annotation means is applied to an image where many semi-transparent objects overlap, such as an X-ray image, at the time of creating a ground truth to train a neural network for image segmentation, a user performing the annotation needs to consider the relationship between a plurality of objects overlap in one pixel and assign an annotation label corresponding to one object to the pixel, and is incapable of assigning an annotation label relating to another objects (that is, only the annotation label of one object can be assigned to one pixel in the single-channel annotation).

Therefore, the neural network for image segmentation trained using the single-channel ground truth is trained to distinguish only one object per pixel, and thus, is incapable of detecting complete shape and outline of all objects when being applied to an image where the plurality of objects overlap, which limits the applicable fields.

Therefore, an object of the invention is to provide an amodal segmentation means for generating an amodal mask, which includes a multi-channel annotation label indicating a category and a complete shape of each of objects with high accuracy, even in the case of a complicated image in which the multiple objects overlap by using the amodal mask generation process 360 illustrated in FIG. 3.

The image processing device 201 illustrated in FIG. 3 has been trained by a multi-channel ground truth according to the invention. The multi-channel ground truth is information including an annotation label, which specifies a category and complete shape and outline of a relevant object including a region hidden by another object, for each object in a predetermined training image.

In other words, it is possible to assign a plurality of annotation labels to one pixel in the multi-channel ground truth according to the invention, which is different from the single-channel ground truth which assigns only one annotation label to one pixel. Thus, information on each object is maintained, and a complete shape or an outline of each object can be specified even if a plurality of objects overlap in the same pixel.

As the image processing device 201 is trained using this multi-channel ground truth, the network can be trained to generate the amodal mask indicating the category and complete shape and outline of each of objects even if the objects overlap.

Note that the multi-channel ground truth may be created by a user (annotator) via a user interface to be described later.

First, a feature extractor 362 receives an input image 361 to be processed by the image processing device 201, and generates a feature map for the input image 361. As described above, the input image 361 may be an image in which a plurality of objects overlap and materials of the objects are represented by a color or the degree of transparency, such as an X-ray image. The input image 361 may be, for example, an X-ray image of a baggage provided by the X-ray device 211 illustrated in FIG. 2 and captured during a baggage inspection.

However, the invention is not limited to the X-ray image, and may be an image, captured by a sensor of an autonomous-driving car, in which a human, a car, a building, and the like overlap, or may be an image where objects do not overlap.

The feature extractor 362 is a convolutional neural network that performs a predetermined convolution operation on the input image 361 to represent an attribute of each pixel of the input image 361 as a feature value. In general, the convolution operation is a binomial operation in which a predetermined function g is translated and superimposed on another function f. As this convolution operation is performed on the input image 361, it is possible to extract convolutional features representing attributes of the image. Here, the feature extractor 362 can extract the convolutional features representing the attributes of the input image 361 as a feature map by performing one or more convolution operations and non-linear transformation. As will be described later, these features are used to predict a category and a region (a shape, an outline, and the like) of an object in the input image 361.

Next, the feature map for the input image 361 generated by the feature extractor 362 is transferred to an amodal segmentation network 363 of the amodal segmentation unit 210 according to the invention. The amodal segmentation network 363 generates a set of (that is, one or more) first amodal masks 364 indicating complete shape and outline of each of objects overlapping in the input image 361 including a region hidden by another object based on the features of the feature map for the input image 361 generated by the feature extractor 362.

The amodal segmentation network 363 may be, for example, a convolutional neural network that predicts coordinates of a region of an object that is partially hidden due to overlap with another object based on a category of the object indicated in the feature of the feature map for the input image 361 generated by the feature extractor 362. For example, when it is determined that a certain object corresponds to a category of a mobile phone as a result of feature extraction, the amodal segmentation network 363 may generate an amodal mask by predicting coordinates of a region of the object determined as the mobile phone according to a size of the existing mobile phone.

Since the first amodal mask 364 is generated for each object in the input image 361, a set including two first amodal masks is generated when two objects overlap in the input image 361 (two first amodal masks indicating predictions of the entire shape and outline of each of the two overlapping objects).

In addition, these first amodal masks 364 are generated in parallel and independently and resized to have the same height and width as the input image 361. After resizing, these first amodal masks 364 are arranged in a three-dimensional structure called a channel (or layer) and stored in the storage unit 225 or the like illustrated in FIG. 2.

Note that the first amodal mask generated here is a temporary interim result of segmentation, and there is a possibility that the complete shape and outline of each object in the input image 361 is not correctly determined. Therefore, it is possible to obtain a second amodal mask 369 representing a segmentation result with higher accuracy than the first amodal mask 364 by processing the first amodal mask 364 with the overlap segmentation unit 215 and the amodal mask correction unit 220 to be described later. The second amodal mask 369 is a multi-channel amodal mask that stores an annotation label at least indicating a category of a relevant object in individual channels, for each of objects overlapping in an overlap region with respect to a pixel in the overlap region.

Next, the set of first amodal masks generated by the amodal segmentation network 363 of the amodal segmentation unit 210 is transferred to the overlap segmentation unit 215 and input to a mask aggregation unit 365. The mask aggregation unit 365 is a functional unit that couples the plurality of first amodal masks 364 with each other to generate an aggregate mask in which the respective first amodal masks 364 overlap. Details of such processing of the mask aggregation unit will be described later.

Next, the aggregate mask generated by the mask aggregation unit 365 is input to an overlap segmentation network 366. The overlap segmentation network 366 generates an overlap mask 367 indicating only an overlap region where a plurality of objects overlap in the input image 310 based on the aggregate mask (not illustrated) generated by the mask aggregation unit 365 and the feature map for the input image 361 generated by the feature extractor 362. The overlap mask 367 indicate only the overlap region where the plurality of objects overlap in the input image 310, and thus, is used as a limiting condition to correct the first amodal mask 364.

Details of the overlap segmentation network 366 will be described later.

Next, the overlap mask 367 generated in the overlap segmentation network 366 of the overlap segmentation unit 215 is transferred to the amodal mask correction unit 220 and input to a mask correction unit 368. The mask correction unit 368 can generate a second amodal mask indicating the complete shape and outline of each of the overlapping objects in the input image 361 with higher accuracy than the first amodal mask 364 by correcting the first amodal mask 364 indicating the complete shape and outline of each of overlapping objects in the input image 361 using the overlap mask 367 that indicates only the overlap region where the plurality of objects overlap in the input image 310.

Since the configuration described above is used, it is possible to provide the amodal segmentation means for generating the amodal mask, which includes the multi-channel annotation label indicating the category and the complete shape of the relevant object with high accuracy, for each of the objects even in the case of the complicated image in which the multiple objects overlap.

Next, a process of generating an aggregate mask according to the embodiment of the invention will be described with reference to FIG. 4.

Figure 4:
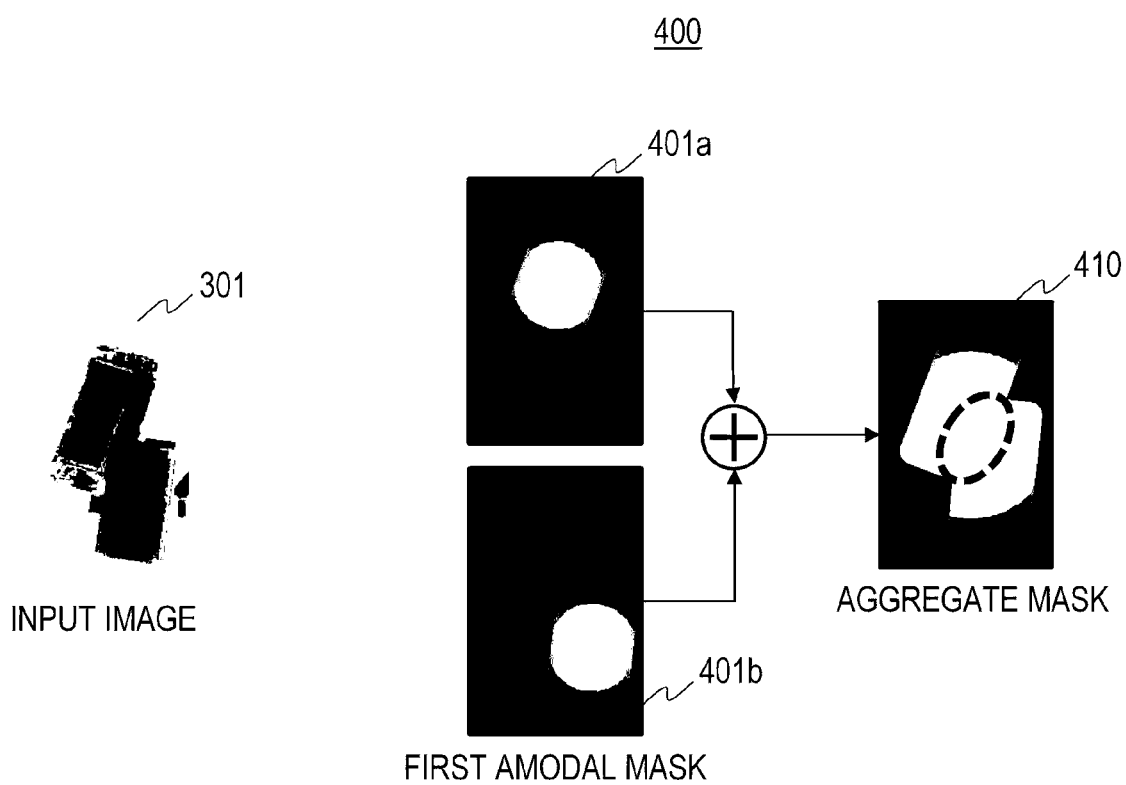
FIG. 4 is a diagram illustrating an example of a process of generating an aggregate mask according to the embodiment of the invention.

FIG. 4 is a diagram illustrating an example of a process 400 of generating an aggregate mask according to the embodiment of the invention. As described above, the amodal segmentation unit according to the invention generates a set of first amodal masks indicating complete shape and outline of each of objects overlapping in the input image 361 including a region hidden by another object based on the feature map extracted from the input image. For example, when two objects overlap in the input image 361, a set including two first amodal masks 401a and 401b indicating the entire shape and outline of each object may be generated.

Each of the first amodal masks 401a and 401b represents a probability value that each pixel belongs to a specific object. More specifically, when two objects A and B partially overlap, there is a high probability that a pixel in a region where the object A and the object B do not overlap belongs to the object A in an amodal mask generated for the object A. Similarly, there is a high probability that a pixel in a region where the object A and the object B do not overlap belongs to the object B in an amodal mask generated for the object B. In both the amodal masks, however, there is a high probability that a pixel in a region where the object A and the object B overlap belongs to both the object A and the object B since it is difficult to determine which object the pixel belongs to.

As described above, the mask aggregation unit according to the invention can generate an aggregate mask 410, obtained by combining the first amodal masks 401a and 401b, in which the probability value of the pixel in the overlap region is high (that is, equal to or higher than a predetermined probability value) by coupling the first amodal masks 401a and 401b with each other and adding the probabilities of the respective pixels.

As a result, it is possible to identify a boundary (coordinates or the like) of the overlap region where the respective objects overlap with high accuracy, and to more easily generate the overlap mask to be described later.

Next, a configuration of a neural network configured to generate the overlap mask according to the embodiment of the invention will be described with reference to FIG. 5.

Figure 5:
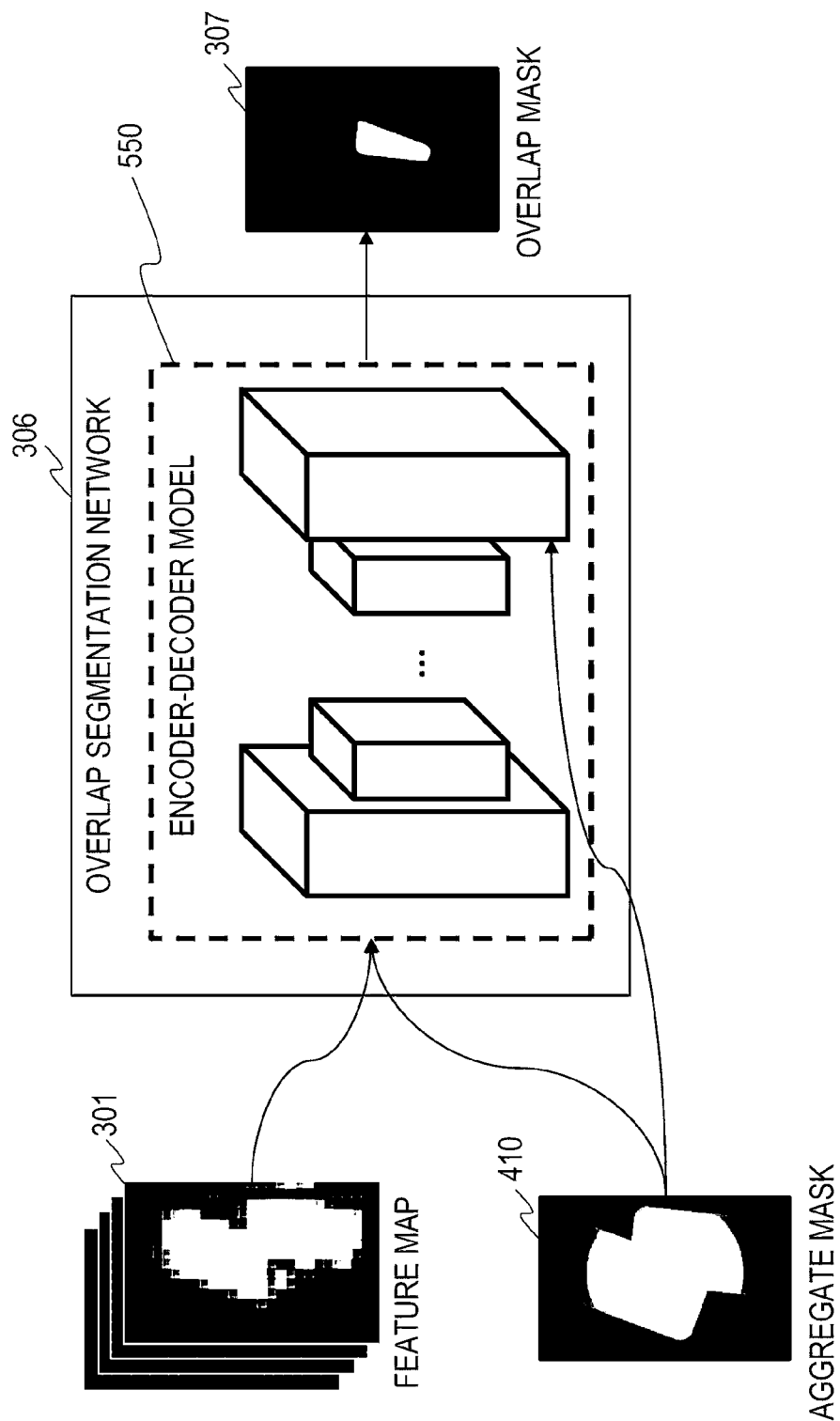
FIG. 5 is a diagram illustrating an example of a configuration of a neural network configured to generate an overlap mask according to the embodiment of the invention.

FIG. 5 is a diagram illustrating an example of the configuration of the neural network configured to generate the overlap mask according to the embodiment of the invention. As described above, the image processing device according to the invention includes the overlap segmentation network 366 that generates the overlap mask 367 indicating only an overlap region where a plurality of objects overlap in the input image based on the aggregate mask 410 generated by the mask aggregation unit and the feature map generated by the feature extractor.

More specifically, the overlap segmentation network 366 may include an encoder-decoder model 550 configured to generate the overlap mask 367. The encoder-decoder model 550 may include a convolutional layer that refines the feature map and extracts more local or global semantic information and a deconvolutional layer that adjusts the feature map to a desired size.

As illustrated in FIG. 5, the aggregate mask 410 is input to not only an input layer of the encoder-decoder model 550 but also a downstream layer subsequent to the input layer. Since the aggregate mask having a high probability value in a region where a plurality of objects overlap is also input to the downstream layer in this manner, the accuracy of the prediction of the overlap region performed in each layer is improved, and the overlap mask 367 indicating only the overlap region can be generated with high accuracy.

Next, a flow of a process of training the amodal segmentation unit and the overlap segmentation unit in the image processing device according to the embodiment of the invention will be described with reference to FIG. 6.

Figure 6:
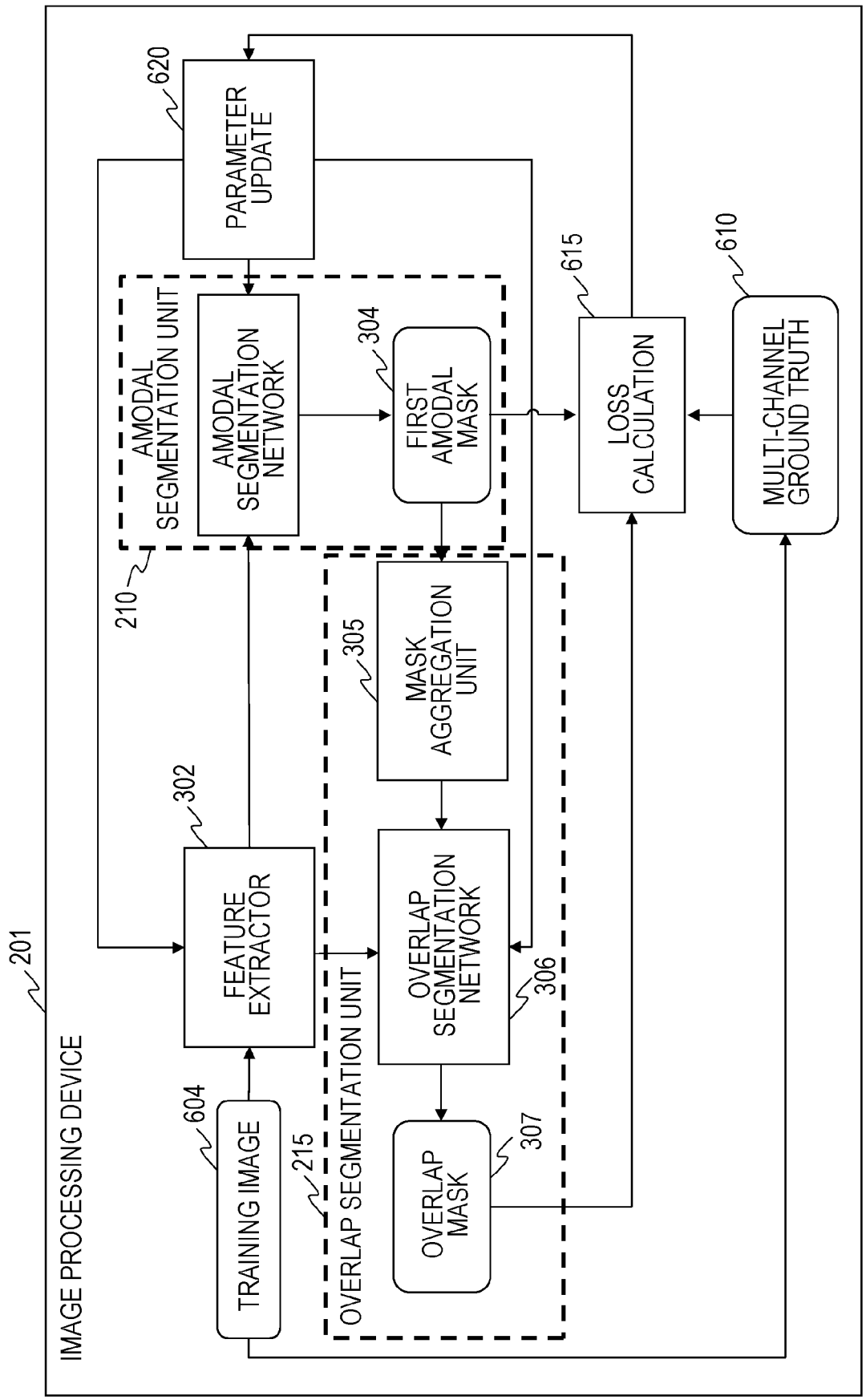
FIG. 6 is a diagram illustrating a flow of a process of training an amodal segmentation unit and an overlap segmentation unit in the image processing device according to the embodiment of the invention.

FIG. 6 is a diagram illustrating a flow of a process 600 of training the amodal segmentation unit and the overlap segmentation unit in the image processing device 201 according to the embodiment of the invention. Since the image processing device 201 illustrated in FIG. 6 is substantially similar to the image processing device 201 described with reference to FIG. 3, the repeated description will be omitted, and elements relating to the training process 600 will be mainly described.

As described above, the neural network in the image processing device 201 according to the invention is trained by the multi-channel ground truth according to the invention. The multi-channel ground truth is information including an annotation label, which specifies a category and complete shape and outline of a relevant object including a region hidden by another object, for each object in a predetermined training image 604. In other words, this ground truth represents a desired segmentation result for the predetermined training image 604.

As the image processing device 201 is trained using this multi-channel ground truth, the network can be trained to generate the amodal mask indicating the category and complete shape and outline of each of objects even if a plurality of the objects overlap.

First, a multi-channel ground truth 610 for the predetermined training image 604 is created. The creation of the multi-channel ground truth 610 may be performed by a user (annotator) using a user interface to be described later, for example.

Next, a loss calculation 615 is calculated. The loss calculation is a calculation configured to quantitatively express a difference between a result of a current network (that is, the amodal segmentation unit 210 and the overlap segmentation unit 215) and the multi-channel ground truth 610 that represents the desired result. The loss calculation 615 here may be calculated by processing the overlap mask 367 output from the overlap segmentation unit 215, the first amodal mask output from the amodal segmentation unit 210, and the multi-channel ground truth 610 input by the user with a predetermined loss function.

Next, a parameter update 620 is performed based on the output of the loss calculation 615. The parameter update means to update layer parameters of the feature extractor 362, the amodal segmentation unit 210, and the overlap segmentation unit 215 based on the feedback of the loss calculation 615 such that a result closer to the segmentation result illustrated in the multi-channel ground truth can be output. The parameter update may be performed by any means such as gradient descent.

Note that the parameter update 620 here is performed by a so-called End-to-End scheme. That is, the parameters of the feature extractor 362, the amodal segmentation unit 210, and the overlap segmentation unit 215 are updated at the same time.

Since the image processing device 201 is trained using the multi-channel ground truth as described above, it is possible to make each neural network learn the features of the overlap region where the plurality of objects overlap in the image, and to generate a higher accuracy amodal mask.

Next, a flow of a process of generating the multi-channel ground truth used in training of the image processing device according to the embodiment of the invention will be described with reference to FIG. 7.

Figure 7:
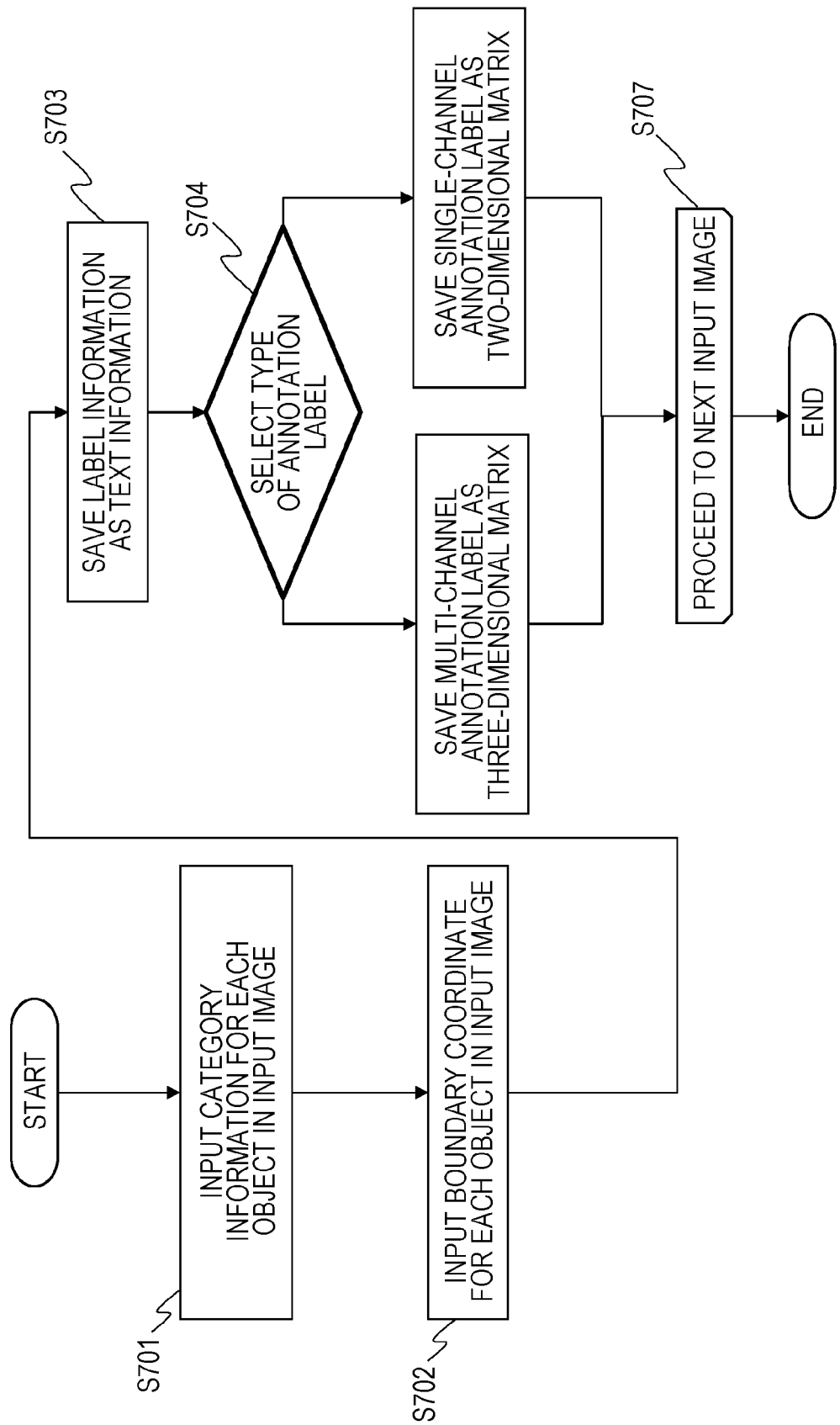
FIG. 7 is a view illustrating a flow of a process of generating a multi-channel ground truth used in training of the image processing device according to the embodiment of the invention.

FIG. 7 is a view illustrating a flow of a process 700 of generating the multi-channel ground truth used in training of the image processing device according to the embodiment of the invention. The process 700 of generating this multi-channel ground truth may be performed by a user (annotator) using, for example, a user interface to be described later.

First, in Step S701, an image which is an annotation target of a human user (annotator) (for example, an X-ray image) is input, and then, the user inputs information (a label) specifying a category of a relevant object for each of objects on the user interface to be described later. Here, the user may select a pixel belonging to a specific object with a mouse or the like and then select a category of the selected object from among predetermined options prepared in advance, for example, or may specify a new category. For example, the user may specify one object as a "mobile phone" and another object as a "fiction." Here, the user may also input information that specifies another feature (for example, a material) of the object, in addition to the category of the object.

Note that the labels indicating the categories assigned to the respective objects are stored as different channels (layers) for the input image. As a result, channels corresponding to the number of objects are generated in one image, and the annotation labels assigned to the different objects are stored in the respective channels.

Next, the user inputs a coordinate of a boundary of a region of a relevant object for each of the objects in the image in Step S702. The boundary coordinate here is a pixel coordinate that defines an outline of a specific object. To input the boundary coordinate, for example, the user may successively select a plurality of pixels tracing the outline of the object or may input a closed space that defines the outline of the object by drawing a line that traces the outline of the object with a mouse or a finger and connecting a start point and an end point. It is also possible to define a plurality of the closed spaces for one object (for example, in the case of an annular object).

The boundary coordinates input herein is also saved as an annotation label in a channel corresponding to each object together with the information specifying the category input in Step S701, When a part of an object is hidden by another object, it is desirable that the user predict an outline of the object including the hidden part to input the boundary coordinate. Here, it is desirable that the user perform annotation according to an annotation rule to be described later.

Next, after the annotation for all the objects in the input image is completed, the information specifying the category input in Step S701 and the coordinate of the boundary of the region of the object input in Step S702 are saved in the text format as the annotation labels in Step S703. For example, the annotation label herein may be saved in the format such as xml, txt, pkl, and hkl.

Here, the above-described category information, boundary coordinate information, and other information (material and the like) may be saved in one file, and pixel-wise annotation information may be saved in another file.

Next, the user selects a desired annotation label type (multi-channel or single-channel) in Step S704. When the multi-channel annotation label is selected, channels each of which is generated for each object and includes a pixel-wise annotation label and specifying a category and a coordinate of the object are saved as a three-dimensional matrix. As a result, a multi-channel ground truth including the annotation labels corresponding to the number of objects is generated for a pixel in a region where a plurality of objects overlap.

When the single-channel ground truth is selected in Step S704, channels each of which is generated for each object are combined into a single-channel including one annotation label for one pixel. Here, when there are a plurality of annotation labels for one pixel, determination on any annotation label that is to be left and any annotation label that is to be deleted may be performed based on, for example, an annotation rule to be described later or a predetermined standard.

Next, the next input image is input in Step S707, and the process returns to Step S701.

As the process 700 of generating the multi-channel ground truth described above is performed, it is possible to create the multi-channel ground truth for training the image processing device according to the invention with a simple input.

Next, a user interface configured to generate the multi-channel ground truth used for training the image processing device according to the embodiment of the invention will be described with reference to FIG. 8.

Figure 8:
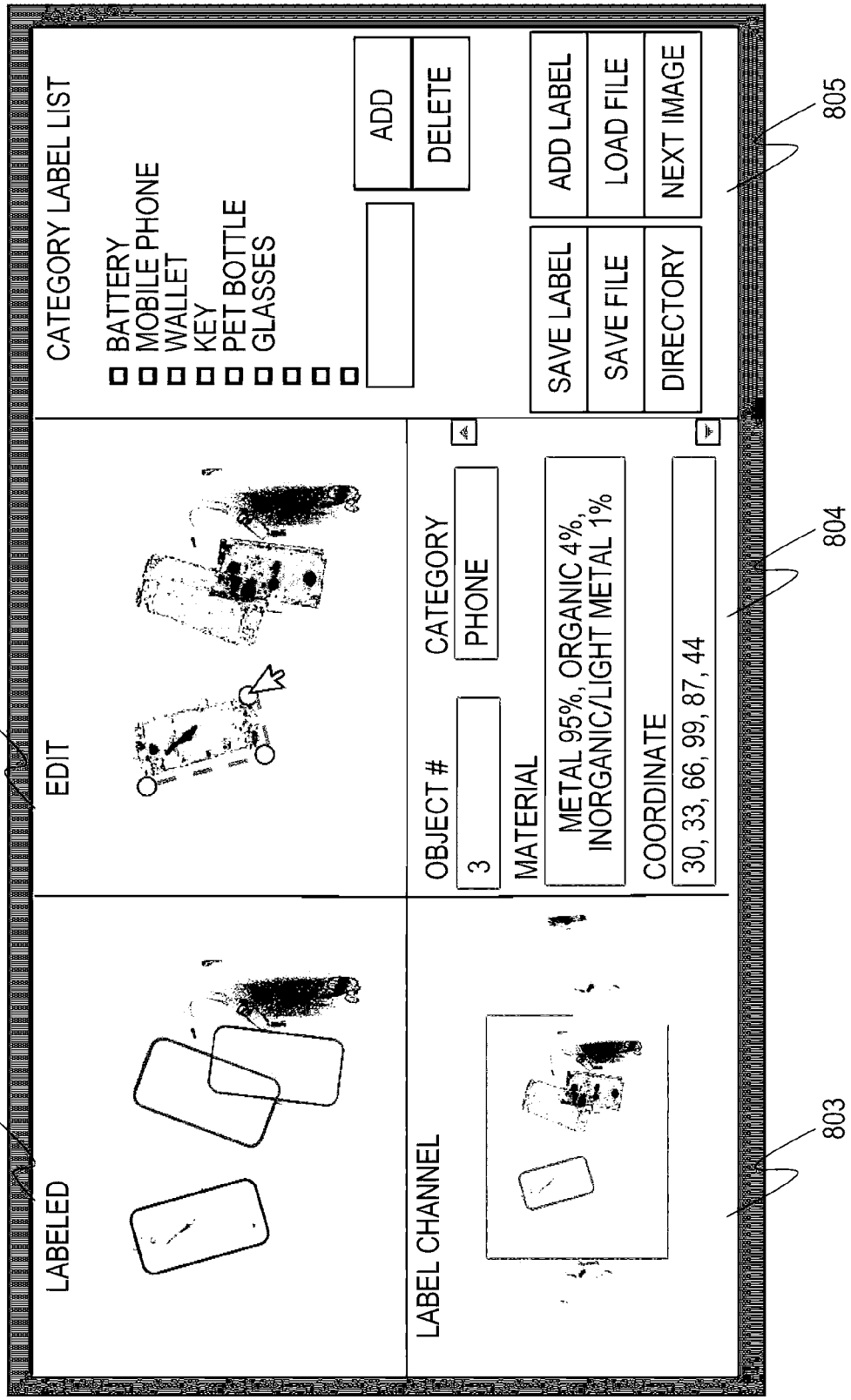
FIG. 8 is a view illustrating an example of a user interface configured to generate the multi-channel ground truth used for training the image processing device according to the embodiment of the invention.

FIG. 8 is a view illustrating an example of a user interface 800 configured to generate the multi-channel ground truth used for training the image processing device according to the embodiment of the invention. As described above, the multi-channel ground truth according to the invention is input by the annotator (human user) using the user interface 800 illustrated in FIG. 8. As illustrated in FIG. 8, the user interface 800 includes a label window 801, an edit window 802, a label channel window 803, an object information window 804, and a category information window 805.

In the label window 801, a mask with an annotation label of an image, which is an annotation target, is displayed. In order to facilitate visibility of outlines of overlapping objects, the respective objects are illustrated in semi-transparent and different colors in the label window 801.

In the edit window 802, the annotator inputs coordinates defining boundaries of regions of the respective objects with respect to the displayed image which is the annotation target. To input the boundary coordinate, for example, the annotator may successively select a plurality of pixels tracing the outline of the object or may input a closed space that defines the outline of the object by drawing a line that traces the outline of the object with a mouse or a finger and connecting a start point and an end point.

In the label channel window 803, the user can select one specific channel from among a plurality of channels (corresponding to the number of objects) generated for the image which is the annotation target. As described above, each of the channels includes one object and the annotation label assigned to the object. After selecting the specific channel, the user can edit the annotation label assigned to the object of the channel. If an annotation label is assigned to an object to which an annotation label has not been assigned, a new channel for the object is automatically created. As a result, the user can easily edit and manage the labels of the plurality of channels constituting the multi-channel ground truth.

In the object information window 804, information on an object being edited in the edit window 802 is displayed. In the object information window 804, an object number, a category, a material, and a coordinate of a selected pixel of the object being edited are displayed, for example, as illustrated in FIG. 8. The object number and coordinate are automatically updated according to an editing operation of the annotator. Information on the category and information on the material may be provided based on the features extracted by the above-described feature extractor, or may be input by the annotator.

In the category information window 805, a list of categories of objects in an image being edited is displayed. The annotator can select a specific object in the edit window 802 after selecting a category listed in a category label list, thereby specifying the object as the selected category. Further, the user can freely add a new category or delete a specific category in the list in the category information window 805.

In addition, the annotator can save a label, add a label, save a file, load a file, open a file directory, or proceed to the next image by pressing a button displayed in the category information window 805.

Since the user interface 800 described above is used, the multi-channel ground truth according to the invention can be created with a simple operation, and the training of the image processing device can be promoted.

Next, an annotation rule which is reference information for the user when generating the multi-channel ground truth according to the embodiment of the invention will be described with reference to FIG. 9.

FIG. 9 is a view illustrating an example of an annotation rule table 900 which is the reference information for the user when generating the multi-channel ground truth according to the embodiment of the invention.

As described above, when the annotator assigns an annotation label to an object using an user interface (for example, the user interface 800 illustrated in FIG. 8), it is sometimes difficult to determine a boundary line of an object depending on the transparency and an overlap state of the object or to determine the order of channels (when generating the single-channel ground truth). Therefore, the annotation rule table 900 is provided as the reference information for the annotator in order to facilitate the creation of a meaningful annotation label in the invention. As the annotation label is assigned according to this annotation rule table 900, it is possible to create a better multi-channel ground truth.

Hereinafter, an X-ray image will be described as an example, but the invention is not limited to the X-ray image.

As illustrated in FIG. 9, the annotation rule table 900 includes information on an overlap state 905, an annotation rule 910, a channel order 915, and an example 920.

The overlap state 905 includes three cases of non-overlap, transparent overlap, and semi-transparent overlap. Here, the non-overlap means a state where objects in an image do not overlap. The transparent overlap means a state where objects in an image overlap and the overlapping objects are transparent (outlines of the respective objects can be identified). The semi-transparent overlap means a state where objects in an image overlap and the overlapping objects are semi-transparent (it is difficult to identify outlines of the respective objects).

In the annotation rule table 900, examples of the annotation rule 910 in relevant overlap, a recommended channel order, and an image in the relevant overlap state are illustrated for each of the overlap states 905.

For example, in the non-overlap and the transparent overlap, an outline (boundary) of each object is easy to discriminate, and thus, the annotator assigns an annotation label along the outline. However, when objects are semi-transparent due to materials of the overlapping objects, there is a case where it is difficult to identify outlines of the objects. In such a case, the annotator predicts an outline based on a color and a category (a mobile phone, a PET bottle, or the like) of an object, and assigns an annotation along the predicted outline.

As described above, when generating the multi-channel ground truth according to the invention, the respective channels are independent and parallel with each other, and it is possible to assign the plurality of annotation labels to one pixel, and thus, it is unnecessary to consider the order of channels (that is, any object to be upper and any object to be lower among the overlapping objects). However, when generating the single-channel ground truth, only one annotation label can be assigned to one pixel (as a rule, pixel of the uppermost object), and thus, it is necessary to consider the order of channels in such a case.

In the case of the non-overlap, there is no overlapping object, and thus, it is unnecessary to consider the order of channels. On the other hand, in the case of the transparent overlap or the semi-transparent overlap, it is desirable to set an object having a higher density as an upper channel and an object having a lower density as a lower channel. This is because there is a tendency that the outline is more clearly identified as the density of the object increases, which leads to a better ground truth.

For example, as an example, it is desirable to set an object with a high density such as metal (generally indicated by a color such as blue and black in an X-ray image) as the uppermost channel, an inorganic/light metal object (generally indicated by a color such as green in the X-ray image) as a channel below the uppermost channel, and an organic object (generally indicated by a color such as yellow in the X-ray image) as the lowermost channel.

In this manner, the annotator can generate the good multi-channel ground truth for training the image processing device according to the invention by assigning the annotation labels according to the annotation rules described above.

Although the example of the annotation rule table 900 according to the invention has been described above, the invention is not limited to the rules illustrated in the annotation rule table 900, and the annotator may appropriately perform the annotation label according to an application mode of the image processing device.

Next, an example of a case where the image processing means according to the embodiment of the invention is applied to an X-ray baggage inspection will be described with reference to FIG. 10.

Figure 10:
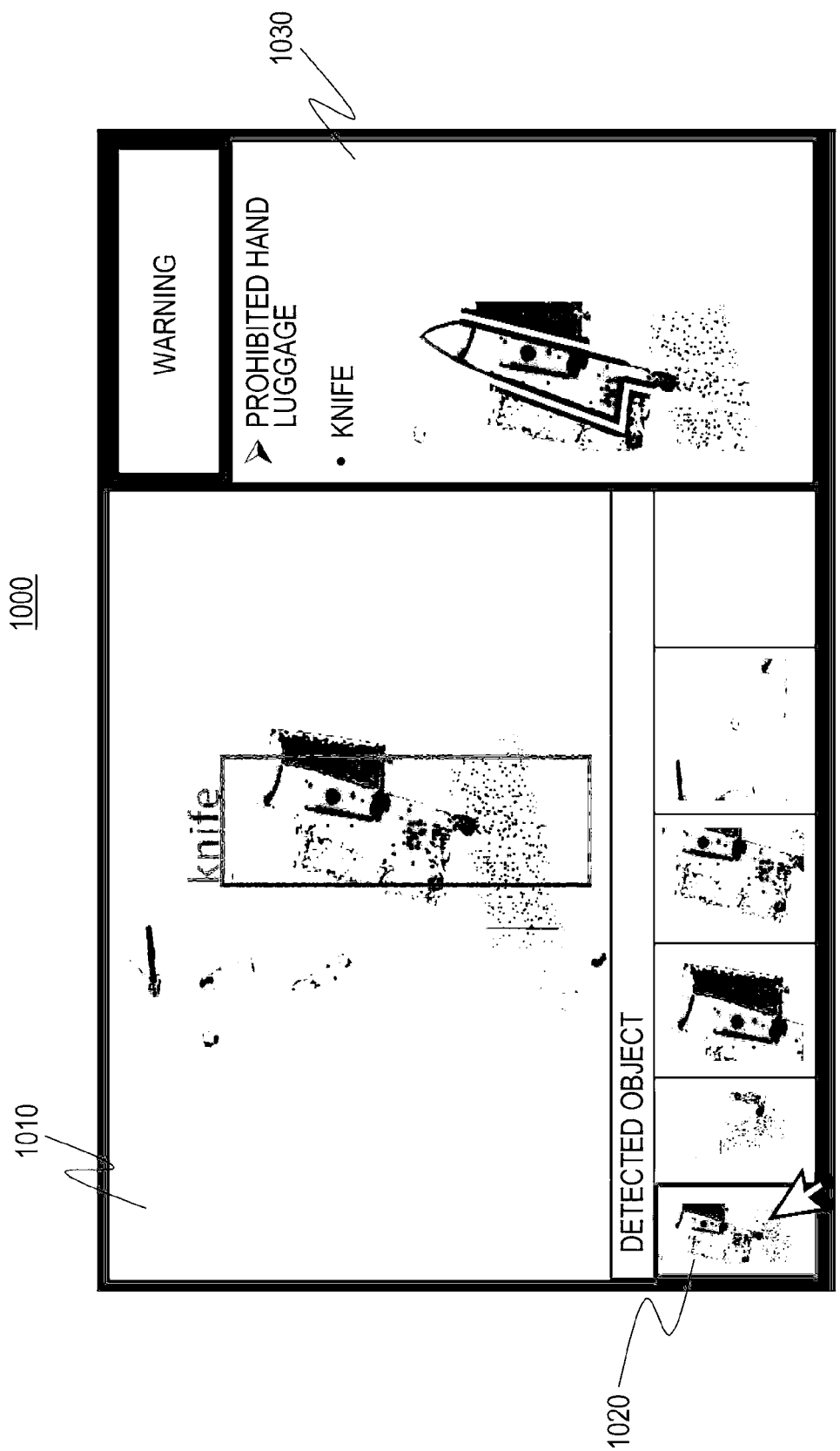
FIG. 10 is a view illustrating an example of a case where an image processing means according to the embodiment of the invention is applied to an X-ray baggage inspection.

FIG. 10 is a view illustrating an example of an X-ray baggage inspection interface 1000 in a case where the image processing means according to the embodiment of the invention is applied to the X-ray baggage inspection. This X-ray baggage inspection interface 1000 may be used to display a segmentation result of an X-ray image of a baggage processed by the image processing device of the invention in cooperation with, for example, an X-ray device for baggage inspection installed in an airport or the like.

As illustrated in FIG. 9, the X-ray baggage inspection interface 1000 according to the invention includes a baggage confirmation window 1010, a detected object window 1020, and a detected object information window 1030.

In the baggage confirmation window 1010, the X-ray image of the baggage captured by the X-ray device is displayed. In the baggage confirmation window 1010, a specific object (for example, an object that is highly likely to fall under an object category of carry-in prohibited) may be highlighted with a colored frame for easy viewing by an inspector.

In the detected object window 1020, images of the respective objects in the X-ray image of the baggage captured by the X-ray device are separately displayed. Further, the object image here may be enlarged and displayed for easy viewing by the inspector.

In the detected object information window 1030, detailed information of the object displayed in the detected object window 1020 is displayed. For example, as illustrated in FIG. 9, a category (a mobile phone or a PET bottle) of the detected object may be displayed. Further, the object image displayed here may be, for example, the amodal mask that is generated by the image processing device of the invention and indicates the entire shape and outline of the object. In addition, when the category of the detected object falls under the object category preset as the carry-in prohibited (for example, when a predetermined similarity criterion is satisfied), a warning may also be displayed to notify the inspector that a dangerous object is included in the baggage.

Since the segmentation result of the X-ray image of the baggage processed by the image processing device of the invention in cooperation with the X-ray device for baggage inspection installed in the airport or the like is displayed on the X-ray baggage inspection interface 1000 in this manner, it is possible to improve the accuracy of detecting an object that is prohibited from being carried in, and to improve the safety of the airport and an airplane.

Next, a panoptic segmentation system configured to generate a panoptic mask according to an embodiment of the invention will be described with reference to FIG. 11.

Figure 11:
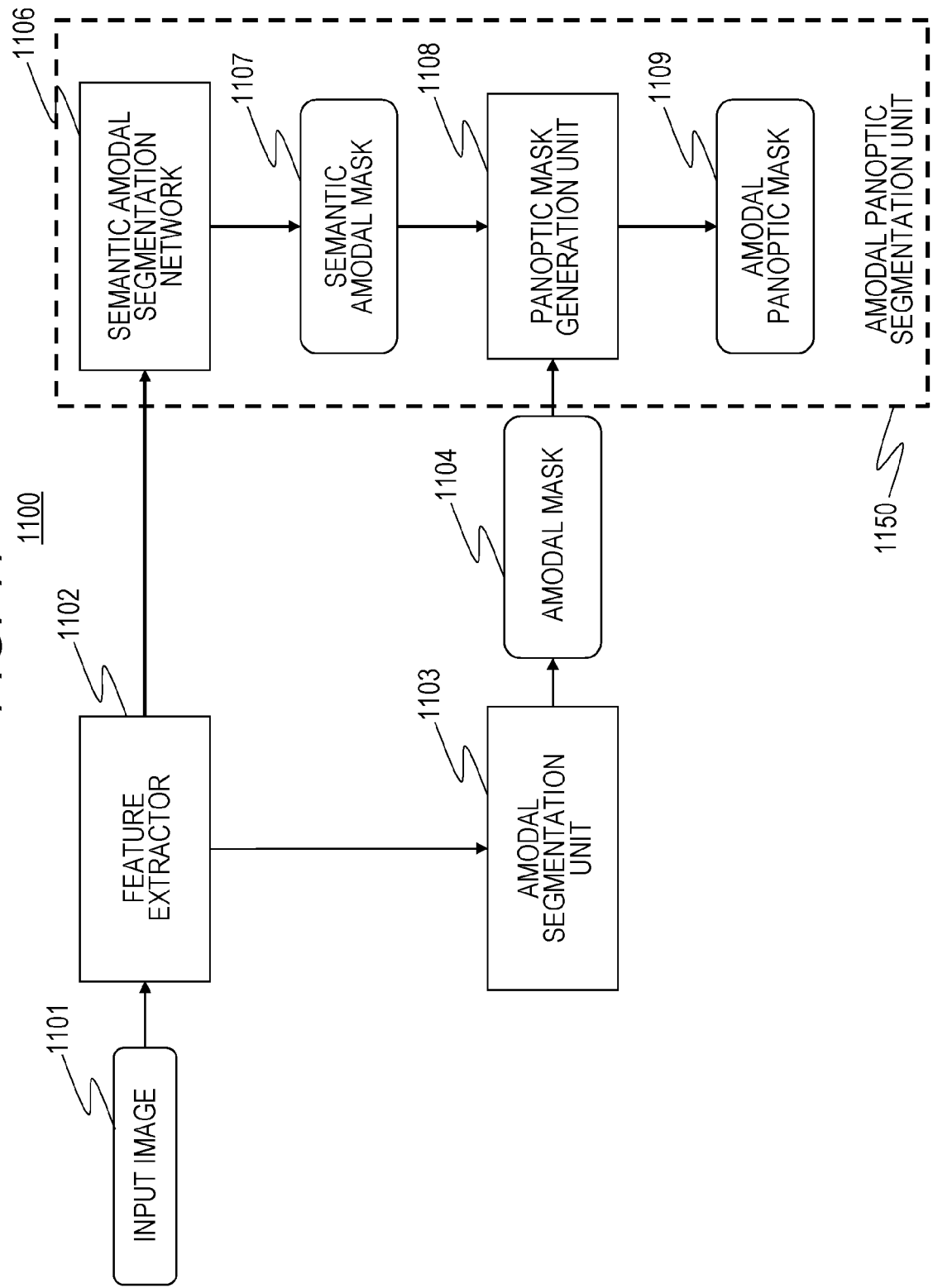
FIG. 11 is a diagram illustrating an example of a panoptic segmentation system configured to generate a panoptic mask according to an embodiment of the invention.

FIG. 11 is a diagram illustrating an example of a panoptic segmentation system 1100 configured to generate a panoptic mask according to the embodiment of the invention.

Although the case where an X-ray image is processed using the image processing device according to the embodiment of the invention has been described as an example so far, the invention is not limited thereto, and can be applied to images other than X-ray image. For example, the image processing device according to the invention can generate an amodal mask indicating the entire shape and outline of each object even in a case of an image in which opaque objects, such as cars, buildings, animals, and humans, overlap.

In the case of such an image, it is necessary to generate amodal masks of a background object such as the sky, a road, and a building in addition to a foreground object such as a human, a car, and an animal. For such a purpose, the panoptic segmentation system 1100 according to the embodiment of the invention is used. The panoptic segmentation system 1100 here is a means for assigning an annotation label indicating a category of a relevant pixel and an instance ID (a numerical value indicating which object the relevant pixel belongs to) to each of pixels in a specific image by combining so-called instance segmentation and semantic segmentation.

As illustrated in FIG. 11, the panoptic segmentation system 1100 according to the invention mainly includes a feature extractor 1102, an amodal segmentation unit 1103, and an amodal panoptic segmentation unit 1150. The feature extractor 1102 is a functional unit that generates a feature map for a predetermined input image 1101. Further, the amodal segmentation unit 1103 is a functional unit that generates an amodal mask indicating the entire shape and outline of each of objects in the input image 1101 based on the feature map generated by the feature extractor 1102. The feature extractor 1102 and the amodal segmentation unit 1103 are substantially similar to the feature extractor 362 and the amodal segmentation unit 210 which have been described with reference to FIG. 3, and thus, the description thereof will be omitted here.

As illustrated in FIG. 11, the amodal panoptic segmentation unit 1150 includes a semantic amodal segmentation network 1106 and a panoptic mask generation unit 1108.

The semantic amodal segmentation network 1106 is configured, for example, using an existing semantic segmentation network such as a fully convolutional network (FCN), and generates a semantic amodal mask 1107 with labeled foreground object and background object in the input image based on the feature map generated by the feature extractor 1102 after being trained by the multi-channel ground truth described above.

The semantic amodal mask 1107 has the same height and width as the input image 1101, and has as many channels as the sum of the foreground object and the background object in the input image 1101. Each of the channels includes a mask for one object category.

The panoptic mask generation unit 1108 combines the amodal mask 1104 generated by the amodal segmentation unit 1103 and the semantic amodal mask 1107 generated by the semantic amodal segmentation network 1106, thereby generating an amodal panoptic mask 1109. More specifically, the panoptic mask generation unit 1108 extracts an instance of the foreground object (mask indicating the entire shape and outline of the object) from the amodal mask 1104, extracts an instance of the background object from the semantic amodal mask 1107, and generates the amodal panoptic mask 1109 by combining the extracted instance of the foreground object and instance of the background object.

In the amodal panoptic mask 1109, an annotation label that indicates a category of an object that appears in a relevant pixel and a unique instance ID (a numerical value indicating which object instance the relevant pixel belongs to) are assigned to each of pixels in the input image 1101. Further, the amodal panoptic mask 1109 has the same height and width as the input image 1101, and has as many channels as the sum of the instance of the foreground object extracted from the amodal Mask 1104 and the instance of the background object extracted from the semantic amodal mask 1107.

Since the panoptic segmentation system 1100 in which the amodal segmentation means according to the invention is combined with the semantic amodal segmentation is used in this manner, for any image, it is possible to obtain a segmentation result indicating complete shapes and outlines of objects in the image.

Although the embodiments of the invention have been described above, the invention is not limited to the above-described embodiments, and various modifications can be made within a scope not departing from a gist of the invention.

What is claimed is:

1. An image processing device comprising:
   an amodal segmentation unit that generates a set of first amodal masks indicating a probability that a particular pixel belongs to a relevant object for each of objects, with respect to an input image in which a plurality of the objects at least partially overlap;
   an overlap segmentation unit that generates an overlap mask corresponding only to an overlap region where the plurality of objects overlap in the input image based on an aggregate mask obtained by combining the set of first amodal masks generated for each of the objects and a feature map generated based on the input image; and an amodal mask correction unit that generates and outputs a second amodal mask, which includes an annotation label at least indicating a category of each of the objects corresponding to a relevant pixel, for each of pixels in the input image using the overlap mask and the aggregate mask;

wherein the overlap segmentation unit includes an encoder-decoder model, and the encoder-decoder model includes:
- a set of convolutional layers that refine the feature map and extract semantic information; and
- a set of deconvolutional layers that adjust the feature map to a desired size.

2. The image processing device according to claim 1, wherein the second amodal mask is a multi-channel amodal mask that stores an annotation label at least indicating a category of a relevant object in individual channels, for each of the objects overlapping in the overlap region with respect to a pixel in the overlap region.

3. The image processing device according to claim 1, further comprising
a ground truth creation unit,
wherein the ground truth creation unit receives input of an annotation label, which specifies a category and a boundary coordinate of each of objects, from a user with respect to a training image where a plurality of the objects at least partially overlap, and generates a ground truth indicating which object a relevant pixel belongs to, for each of pixels of the training image based on the annotation label.

4. The image processing device according to claim 3, wherein the amodal segmentation unit includes a convolutional neural network, and
the convolutional neural network is trained using the training image and a ground truth generated for the training image.

5. The image processing device according to claim 1, wherein
the aggregate mask is input to not only an input layer of the encoder-decoder model but also a downstream layer subsequent to the input layer.

6. The image processing device according to claim 1, further comprising:
a semantic amodal segmentation unit that generates a semantic amodal mask indicating a category of an object corresponding to a relevant pixel for each of pixels in the input image based on the feature map generated based on the input image; and
a panoptic mask generation unit that extracts an instance of a background object from the semantic amodal mask, extracts an instance of a foreground object from the second amodal mask, and combines the instance of the background object and the instance of the foreground object to generate an amodal panoptic mask storing an annotation label indicating the category of a relevant object and an unique instance ID in individual channels for each of the objects.

7. The image processing device according to claim 1, wherein the input image is an X-ray image in which a plurality of semi-transparent objects overlap.

8. An image processing method comprising:
generating a set of first amodal masks indicating a probability that a particular pixel belongs to a relevant object for each of objects, with respect to an input image in which a plurality of the objects at least partially overlap;
an overlap segmentation unit generating an overlap mask corresponding only to an overlap region where the plurality of objects overlap in the input image based on an aggregate mask obtained by combining the set of first amodal masks generated for each of the objects and a feature map generated based on the input image;
refining the feature map and extracting semantic information;
adjusting the feature map to a desired size; and
generating and outputting a second amodal mask, which includes an annotation label at least indicating a category of each of the objects corresponding to a relevant pixel, for each of pixels in the input image using the overlap mask and the aggregate mask,
wherein the overlap segmentation unit includes an encoder-decoder model, and the encoder-decoder model includes:
a set of convolutional layers that refine the feature map and extract semantic information; and
a set of deconvolutional layers that adjust the feature map to a desired size.

9. An image processing system comprising:
an X-ray device that acquires an X-ray image; and
an image processing device that generates an amodal mask indicating an entire outline of each of objects in an input image,
wherein the X-ray device and the image processing device are connected via a communication network, and
the image processing device includes:
an amodal segmentation unit that receives an input image in which a plurality of objects at least partially overlap from the X-ray device via the communication network, and generates a set of first amodal masks indicating a probability that a particular pixel belongs to a relevant object for each of the objects, with respect to the input image;
an overlap segmentation unit that generates an overlap mask corresponding only to an overlap region where the plurality of objects overlap in the input image based on an aggregate mask obtained by combining the set of first amodal masks generated for each of the objects and a feature map generated based on the input image; and
an amodal mask correction unit that generates and outputs a second amodal mask, which includes an annotation label at least indicating a category of each of the objects corresponding to a relevant pixel, for each of pixels in the input image using the overlap mask and the aggregate mask;
wherein the overlap segmentation unit includes an encoder-decoder model, and the encoder-decoder model includes:
a set of convolutional layers that refine the feature map and extract semantic information; and
a set of deconvolutional layers that adjust the feature map to a desired size.

* * * * *